UNITED STATES PATENT OFFICE.

JAMES LONGMORE, OF LIVERPOOL, COUNTY OF LANCASTER, ENGLAND.

UTILIZING COTTON-SEED-OIL RESIDUE, &c.

SPECIFICATION forming part of Letters Patent No. 284,313, dated September 4, 1883.

Application filed June 4, 1883. (No specimens.) Patented in England November 16, 1882, No. 2,297, and in France November 16, 1882, No. 152,133.

*To all whom it may concern:*

Be it known that I, JAMES LONGMORE, of Liverpool, in the county of Lancaster and Kingdom of Great Britain, have invented certain new and useful Improvements in Utilizing Cotton-Seed-Oil Residues and Cotton-Seed Oil, (for which I have obtained Letters Patent in England, No. 2,297, dated November 16, 1882, and France, No. 152,133, dated November 16, 1882,) of which the following is a specification.

In the refining of cotton-seed oil, the oil is treated with caustic soda or potash, when a mucilaginous precipitate of soapy matter, technically called "mucilage," is thrown down, carrying with it the coloring-matter contained in the oil. This substance has hitherto been chiefly used in the arts as a rough soap, or adulterant of soap, or for the manufacture of stearine therefrom.

My invention is designed for the purpose of utilizing this article by extracting valuable matters therefrom, chiefly refined soap and coloring-matters.

My invention consists, essentially, in forming a solution of the mucilage by melting or the addition of water, then adding sufficient caustic alkali to complete the saponification and separate the soap from the lye thus formed. The lye, which contains nearly all the coloring-matter in solution, is drawn off, and fresh water added until the soap again dissolves, or, as it is technically termed, "closes," when it is again separated with caustic lye and the alkali removed. The process, if necessary, is repeated three or four times, until the coloring-matter is sufficiently removed. The slightly-colored lyes of the later washings can be used for the first operation with fresh mucilage, it first being dissolved, as directed, and the lyes being increased to the strength necessary to form the soap and separate it, as hereinafter described.

The process I prefer to adopt at present is as follows: The mucilage is placed in a suitable vessel, and if, as is usually the case, it contains sufficient water to form the excess of lye necessary for its formation into soap, and the solution of the coloring-matter, it is melted by the application of heat without further addition of water. Caustic-soda lye of the strength of 30° to 50° Twaddle, or preferably, to avoid unnecessary increase of water, powdered caustic soda such as that supplied by the Greenbank Alkali Works Company, Limited, St. Helen's, Lancashire, is then added in successive portions (time being allowed between each addition for it thoroughly to dissolve and amalgamate) until saponification is completed, the additions being continued until the soap separates from the lye and is well open. If the mucilage be of good consistence and contain little water, sufficient is added to dissolve and melt it, and the process proceeded with as above, the saponification and separation being effected by means of lyes; or, if the whole amount of water necessary to form the requisite lyes be added in the first instance, the powdered solid caustic can be used. The lye, which contains in solution the coloring-matter, is separated by settling and decantation, or by filtration. To further purify the soap and free it from any remaining coloring-matter, water is then run in until the soap dissolves and technically closes, fresh caustic or lye of about 20° to 30° Twaddle is again added, and the operation repeated till the soap is sufficiently refined. It is then finished into bars, or otherwise, in the usual manner, or treated with dilute mineral acids, and the fatty acids skimmed off as they rise.

It will be seen from the foregoing that the ordinary use of salt in separating soap from its solution is avoided, owing to its lessening the solubility of the coloring-matter in alkaline lyes, thereby materially retarding the operations. If used to excess in lyes of ordinary strength, it quite destroys the said solubility. A little may be used, however, in assisting the separation without much harm; but it is not to be recommended, as it has also a deleterious effect upon the coloring-matter itself. After the extraction of the coloring-matter, it can of course be used in the ordinary way to finish with. Soap being insoluble in alkaline lyes above a certain strength—that is, about 10° to 14° Twaddle—to separate it from the excess of water added will require that water being brought up to the strength named by the addition of caustic; and it will therefore be seen that the quantity of lyes to be used will vary in exact proportion to the water contained in or used with the mucilage or soap, the strength of course being greatly a matter of choice, a strong lye requiring less in quantity to effect the separation, and vice versa. I do not recommend, however, the use of above 80° Twaddle, and prefer it at the strengths already named.

The removal of the coloring-matter will be greatly facilitated if, after the first operation, or at any subsequent stage, the soap is what is technically called "fitted"—that is, it is dissolved or closed by the addition of water, and the head or fob boiled out, the whole being allowed to remain quiescent for two days, when the usual separation takes place, the excess of alkali, together with the coloring-matter, being carried down, and is contained in the lower stratum of soap, or technically "nigre," which is then removed, and can be treated with a fresh batch of mucilage.

Should the mucilage have been made with potash, or should soft soap be required, potash lyes must be substituted for soda in the foregoing operations, though of course the saponification of a potash mucilage can be completed with soda, and vice versa.

The strongly dark-colored lye, when drawn off, is filtered, and either supersaturated with carbonic acid or neutralized with acetic, sulphuric, or hydrochloric acid, or with an alum, sulphate or acetate of alumina, or soluble calcium salt—such as chloride of calcium—and the coloring-matter precipitated. The lake or precipitate formed, as the case may be, is collected on a filter, washed, and dried. The coloring-matter being removed, the liquor is freed from any excess of acid other than carbonic acid by means of chalk or other form of calcium, and evaporated till a large quantity of its component salts has crystallized out, when the remaining mother-liquor is added to a fresh batch of liquor and is treated anew.

It will be seen at once that by this invention the soap made from crude cotton-seed oil can also be purified and decolorized in the same manner as that herein described, as it can be separated by caustic lye instead of by salt, and the coloring-matter, being soluble in caustic potash or caustic soda, can be separated, as already described. Several other dark-colored soaps can be purified in same manner.

I claim as my invention—

1. The improvement in the manufacture of cotton-seed-oil soap from crude cotton-seed oil or mucilage, which consists in making a solution of the material and separating by additional caustic, substantially as specified.

2. The improvement in the process of manufacturing cotton-seed-oil soap from crude cotton-seed oil or mucilage, which consists in extracting the crude soap, adding water till it closes or dissolves, separating or "opening" it again by means of added caustic, drawing off the lye, and repeating the operation till the soap is sufficiently light in color.

3. The improvement in the manufacture of cotton-seed-oil soap from crude cotton-seed oil or mucilage, which consists in dissolving or melting it, adding caustic till the soap separates, withdrawing the lye, redissolving the soap, adding caustic again, withdrawing the lye, and, if necessary, repeating the operation till sufficiently purified, and then forming it into bars or cakes or other objects, in the usual manner.

4. The improvement in the purification of cotton-seed-oil soap, which consists in extracting the coloring-matter from it by dissolving it, then separating with caustic, and withdrawing the caustic lye with the coloring-matter dissolved in it, substantially as described.

5. The improvement in the process of manufacturing purified fatty acids from cotton-seed oil, which consists of separating the soap by means of caustic alkali, and, after extracting the caustic lye, treating the soap with carbonic, acetic, sulphuric, or hydrochloric acid, substantially as herein described.

6. The improvement in the manufacture of coloring-matter, which consists in separating soap from crude cotton-seed oil or mucilage by means of caustic alkali, and precipitating the coloring-matter from the caustic liquor, substantially as described.

7. The improvement in the process of separating cotton-seed-oil soap, which consists in adding to the soap solution powdered caustic, a little at a time, till the soap opens.

8. As a new article of manufacture, the coloring-matter extracted from crude cotton-seed oil or mucilage, substantially as described.

JAMES LONGMORE.

Witnesses:
W. P. THOMPSON,
J. O. O'BRIEN.